United States Patent
Kapsenberg

(10) Patent No.: US 12,063,457 B2
(45) Date of Patent: Aug. 13, 2024

(54) SYSTEMS, APPARATUS, AND METHODS FOR TRANSMITTING IMAGE DATA

(71) Applicant: Waymo LLC, Mountain View, CA (US)

(72) Inventor: Pieter Kapsenberg, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 132 days.

(21) Appl. No.: 17/956,218

(22) Filed: Sep. 29, 2022

(65) Prior Publication Data

US 2023/0035747 A1    Feb. 2, 2023

Related U.S. Application Data

(63) Continuation of application No. 17/116,448, filed on Dec. 9, 2020, now Pat. No. 11,470,282.

(51) Int. Cl.
*H04N 7/18* (2006.01)
*H04N 1/00* (2006.01)
(Continued)

(52) U.S. Cl.
CPC ......... *H04N 7/183* (2013.01); *H04N 1/00095* (2013.01); *H04N 1/2112* (2013.01);
(Continued)

(58) Field of Classification Search
CPC .. H04N 7/183; H04N 1/2141; H04N 1/32368; H04N 2101/00; H04N 2201/3295
See application file for complete search history.

(56) References Cited

U.S. PATENT DOCUMENTS

| 4,375,682 | A | 3/1983 | Abbott et al. |
| 6,167,473 | A | 12/2000 | Kho |

(Continued)

FOREIGN PATENT DOCUMENTS

| JP | 2002135663 A | 5/2002 |
| WO | 2018212809 A1 | 11/2018 |

OTHER PUBLICATIONS

Baker, "The design of a CMOS sensor camera system for a nanosatellite", Oct. 2006.

(Continued)

*Primary Examiner* — Nicholas Pachol
(74) *Attorney, Agent, or Firm* — McDonnell Boehnen Hulbert & Berghoff LLP

(57) ABSTRACT

Examples described relate to systems, methods, and apparatus for transmitting image data. The apparatus may comprise a memory buffer configured to store data elements of an image frame and generate a signal indicating that each of the data elements of the image frame have been written to the memory buffer, a processor configured to initiate a flush operation for reading out at least one data element of the image frame from the memory buffer and to output the at least one data element at a first rate, a rate adjustment unit configured to receive the at least one data element from the processor at the first rate and to output the at least one data element at a second rate, and a multiplexer configured to receive the at least one data element from the processor at the first rate and configured to receive the at least one data element from the rate adjustment unit at the second rate. The multiplexer may select the at least one data element at the second rate for transmitting on a bus in response to receiving the signal from the memory buffer.

20 Claims, 6 Drawing Sheets

(51) Int. Cl.
*H04N 1/21* (2006.01)
*H04N 1/32* (2006.01)
*H04N 101/00* (2006.01)

(52) U.S. Cl.
CPC ....... *H04N 1/2141* (2013.01); *H04N 1/32368* (2013.01); *H04N 2101/00* (2013.01); *H04N 2201/3295* (2013.01)

(56) References Cited

U.S. PATENT DOCUMENTS

| | | |
|---|---|---|
| 6,330,626 B1 | 12/2001 | Dennin et al. |
| 6,667,994 B1 | 12/2003 | Farhan |
| 6,972,790 B2 | 12/2005 | Suska |
| 7,034,868 B2 | 4/2006 | Sasaki |
| 7,475,266 B2 | 1/2009 | Ogawa |
| 7,573,510 B2 | 8/2009 | Iijima |
| 8,089,514 B2 | 1/2012 | Shimizu et al. |
| 8,194,155 B2 | 6/2012 | Kiba et al. |
| 8,422,868 B2 | 4/2013 | Kuriyama |
| 8,928,793 B2 | 1/2015 | McMahon |
| 9,519,540 B2 | 12/2016 | Atkisson et al. |
| 9,979,970 B2 | 5/2018 | Thirumalai et al. |
| 9,996,488 B2 | 6/2018 | Sengoku |
| 10,061,537 B2 | 8/2018 | Kersh et al. |
| 11,470,282 B2 | 10/2022 | Kapsenberg |
| 2005/0010960 A1* | 1/2005 | Kitazawa ............ H04N 19/42 375/E7.218 |
| 2005/0143031 A1* | 6/2005 | Moonen ............... H03J 3/08 455/168.1 |
| 2006/0209684 A1* | 9/2006 | Bei ................. H04L 47/30 370/468 |
| 2007/0081412 A1 | 4/2007 | Jung et al. |
| 2008/0186850 A1 | 8/2008 | Lee et al. |
| 2016/0117872 A1* | 4/2016 | Plante ............... H04N 7/183 701/32.2 |
| 2017/0134291 A1 | 5/2017 | Ooishi et al. |
| 2017/0272545 A1 | 9/2017 | Kwon et al. |
| 2017/0347158 A1 | 11/2017 | Fu et al. |
| 2019/0104333 A1 | 4/2019 | Roth et al. |
| 2020/0258549 A1 | 8/2020 | Hansen |
| 2021/0165086 A1* | 6/2021 | Chen ................. G01S 15/96 |

OTHER PUBLICATIONS

International Searching Authority, International Preliminary Report on Patentability, dated Apr. 1, 2022, issued in connection with International Application No. PCT/US2021/061775.

* cited by examiner

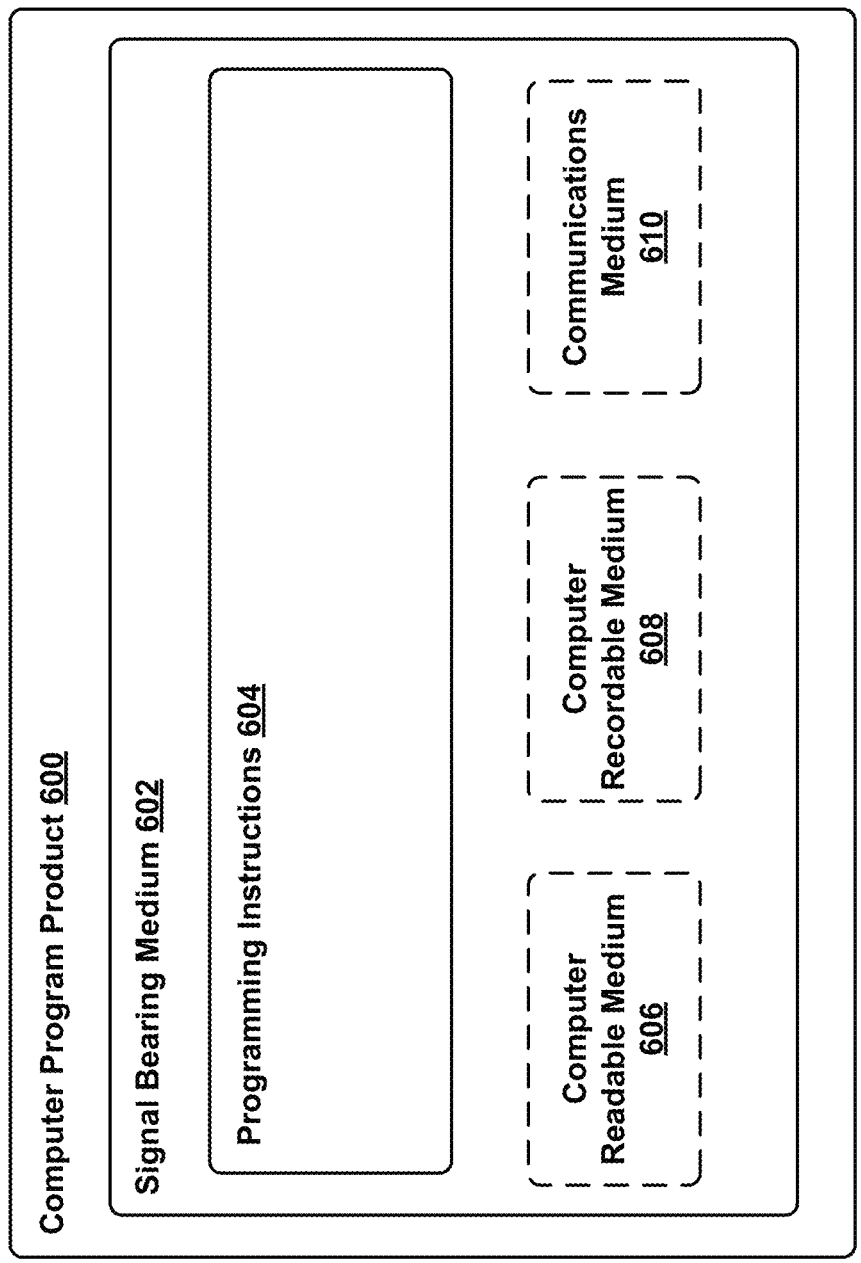

SYSTEMS, APPARATUS, AND METHODS FOR TRANSMITTING IMAGE DATA

CROSS-REFERENCE TO RELATED APPLICATIONS

This application is a continuation of application Ser. No. 17/116,448, filed Dec. 9, 2020, which application is incorporated herein by reference.

BACKGROUND

Autonomous vehicles may use various computing systems to aid in the transport of passengers from one location to another. Some autonomous vehicles may operate based on some initial input or continuous input from an operator, such as a pilot, driver, or passenger. Other systems, such as autopilot systems, may be used only when the system has been engaged, which permits the operator to switch from a manual mode (where the operator may exercise a high degree of control over the movement of the vehicle) to an autonomous mode (where the vehicle essentially drives itself) to modes that lie somewhere in between.

Such vehicles are typically equipped with various types of sensors in order to detect objects in the surrounding environment. For example, an autonomous vehicle may include lasers, sonar, radar, cameras, and other devices which scan and record data from the surroundings of the vehicle. The image or sensor data from one or more of these devices may be transferred or transmitted to other components of the system (e.g., a main memory) of the vehicle via a bus.

Depending on the quality and size of the image data, a substantial portion of the available bus bandwidth may be consumed during a transmission of the image data. In some transmissions, the total bus bandwidth may be exceeded. As a result, the transmission of image data on a bus may impact the performance of the system components and the quality of service provided by the system. For example, the transmission of image data may cause data losses, reduced bus speed, queuing delays, and increased latencies for bus transactions.

SUMMARY

Systems, methods, and apparatus for transmitting or transferring image data are disclosed. In one aspect, the present application describes an apparatus comprising a memory buffer configured to store data elements of an image frame and to generate a signal indicating that each of the data elements of the image frame have been written to the memory buffer. The apparatus also comprises a processor configured to initiate a flush operation for reading out at least one data element of the image frame from the memory buffer and to output the at least one data element of the image frame at a first transmission rate. Further, the apparatus includes a rate adjustment unit configured to receive the at least one data element of the image frame from the processor at the first transmission rate and to output the at least one data element of the image frame at a second transmission rate. The apparatus also includes a multiplexer configured to receive the at least one data element of the image frame from the processor at the first rate and to receive the at least one data element of the image frame from the rate adjustment unit at the second transmission rate. The multiplexer is configured to select the at least one data element of the image frame at the second transmission rate for transmission on a bus in response to receiving the signal from the memory buffer.

In another aspect, the present application describes a method comprising writing data elements of an image frame in a memory buffer and generating a signal after the data elements of the image frame have been written to the memory buffer. The method also comprises initializing, by a processor, a flushing operation for reading out at least one data element of the image frame from the memory buffer, providing the at least one data element of the image frame at a first transmission rate, and providing the at least one data element of the image frame at a second transmission rate. Further, the method comprises selecting the at least one data element of the image frame at the second transmission rate in response to receiving the signal and transmitting the at least one data element of the image frame at the second transmission rate on a bus.

In still another aspect, a non-transitory computer-readable medium storing instructions is disclosed that, when the instructions are executed by one or more processors, causes the one or more processors to perform operations. The operations may include writing data elements of an image frame in a memory buffer and generating a signal after the data elements of the image frame have been written to the memory buffer. The operations also include initializing a flushing operation for reading out at least one data element of the image frame from the memory buffer, providing the at least one data element of the image frame at a first transmission rate, and providing the at least one data element of the image frame at a second transmission rate. Further, the operations include selecting the at least one data element of the image frame at the second transmission rate in response to receiving the signal, and transmitting the at least one data element of the image frame at the second transmission rate on a bus.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE DRAWINGS

FIG. 6 is a schematic diagram of a computer program, according to an example implementation.

DETAILED DESCRIPTION

Figure 1:
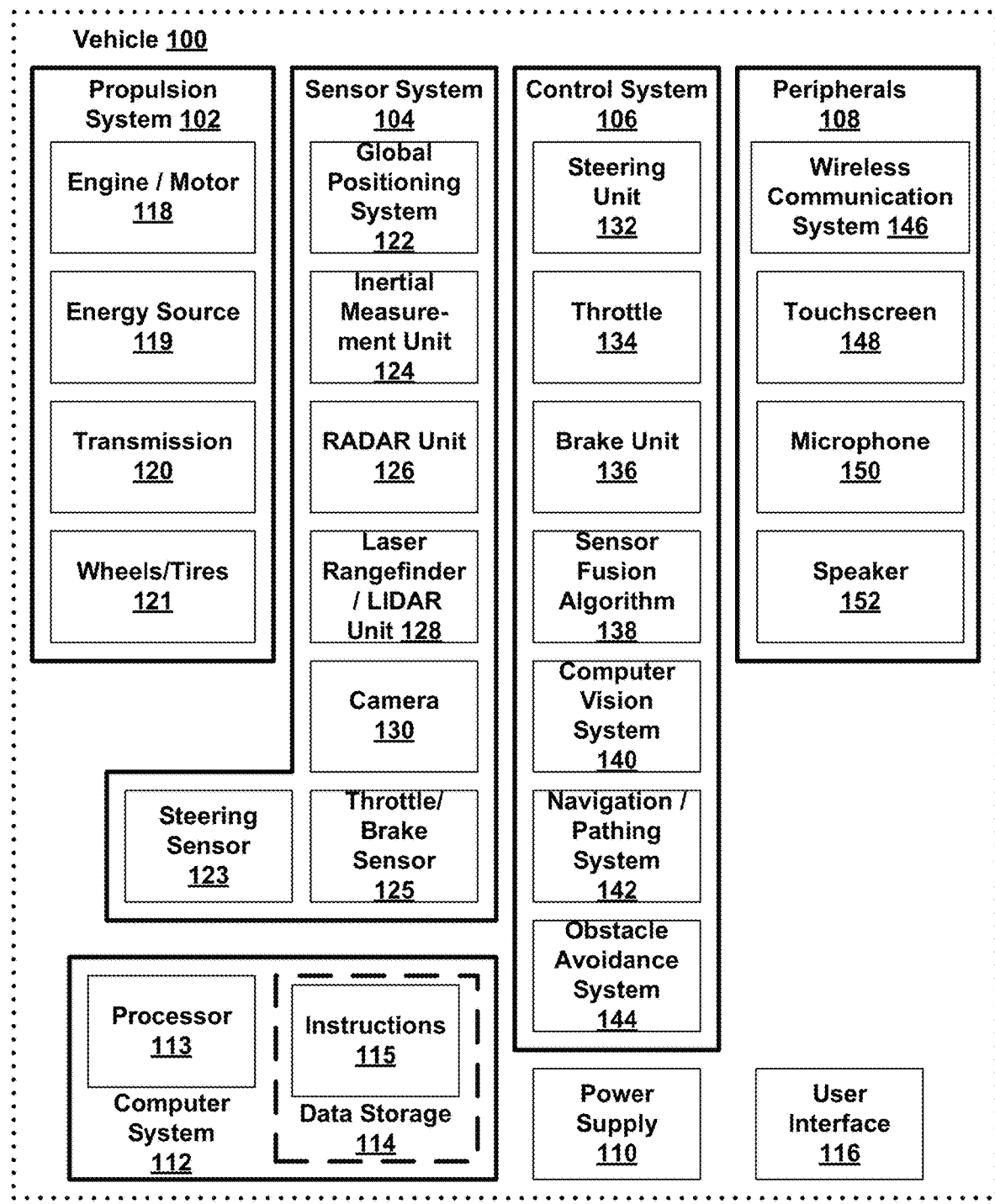
FIG. 1 is a functional block diagram illustrating computing systems of a vehicle, according to an example implementation.

Example systems, apparatus, and methods are described herein. It should be understood that the words "example," "exemplary," and "illustrative" are used herein to mean "serving as an example, instance, or illustration." Any implementation or feature described herein as being an "example," being "exemplary," or being "illustrative" is not necessarily to be construed as preferred or advantageous over other implementations or features. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein. Additionally, in this disclosure, unless otherwise specified and/or unless the particular context clearly dictates otherwise, the terms "a" or "an" means at least one, and the term "the" means the at least one. Yet further, the term "enabled" may mean active and/or functional, not necessarily requiring an affirmative action to turn on.

Furthermore, the particular arrangements shown in the Figures should not be viewed as limiting. It should be understood that other implementations might include more or less of each element shown in a given Figure. Further, some of the illustrated elements may be combined or omitted. Yet further, an example implementation may include elements that are not illustrated in the Figures.

The present disclosure provides systems, apparatus, and methods that improve the functioning of computer systems of an autonomous vehicle by adjusting or changing the data transmission rate for transmitting image data to components and/or systems of a vehicle via a bus. An autonomous vehicle operating on a road or other surface may capture images of the environment surrounding the vehicle in order to determine a safe trajectory or path for the vehicle to continue traveling. A computing device controlling the vehicle in an autonomous mode may use one or more image-capture devices, such as cameras, for capturing images of the environment surrounding the vehicle to assist with navigation through the environment. The image-capture devices may be positioned on the vehicle to capture various portions of the environment surrounding the vehicle. The image capture devices may be coupled to a processor configured to perform one or more image processing tasks.

During operation, the image-capture devices may capture a relatively large amount of image data for detection, recognition, tracking, classification, and other analysis of the environment. The image-capture devices may be capable of generating more data than can be timely processed by processing resources provided by the autonomous vehicle. For example, the amount of data transfer bandwidth available for the autonomous vehicle may limit the amount of image data that can be transferred to the components and/or systems of the vehicle via a bus. Accordingly, circuitry may be provided to reduce the data transmission or transfer rate of the image data for transmission to the components and/or systems of the vehicle via the bus.

In one aspect, an apparatus may comprise a memory buffer configured to store data elements of an image frame and a processor configured to initiate a flushing operation for reading out at least one data element of the image frame from the memory buffer. The apparatus may include a rate adjustment unit configured to receive the at least one data element of the image frame from the processor at a first transmission rate and to output the at least one data element of the image frame at a second transmission rate. The apparatus may also include a multiplexer configured to receive the at least one data element of the image frame from the processor at the first transmission rate and to receive the at least one data element of the image frame from the rate adjustment unit at the second transmission rate. The multiplexer may be configured to select the at least one data element of the image frame at the second rate for transmission on a bus in response to receiving the signal from the memory buffer.

Example systems, apparatus, and method within the scope of the present disclosure will now be described in greater detail. An example system may be implemented in or may take the form of a computer system of an automobile. However, an example system may also be implemented in or take the form of other systems for vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, trolleys, and robot devices. Other vehicles are possible as well.

Referring now to the figures, FIG. 1 is a functional block diagram illustrating an example vehicle 100, which may be configured to operate fully or partially in an autonomous mode. More specifically, the vehicle 100 may operate in an autonomous mode without human interaction through receiving control instructions from a computing system. As part of operating in the autonomous mode, the vehicle 100 may use sensors to detect and possibly identify objects of the surrounding environment to enable safe navigation. In some implementations, the vehicle 100 may also include subsystems that enable a driver to control operations of the vehicle 100.

As shown in FIG. 1, the vehicle 100 may include various subsystems, such as a propulsion system 102, a sensor system 104, a control system 106, one or more peripherals 108, a power supply 110, a computer system 112, a data storage 114, and a user interface 116. In other examples, the vehicle 100 may include more or fewer subsystems, which can each include multiple elements. The subsystems and components of the vehicle 100 may be interconnected in various ways. In addition, functions of the vehicle 100 described herein can be divided into additional functional or physical components, or combined into fewer functional or physical components within implementations.

The propulsion system 102 may include one or more components operable to provide powered motion for the vehicle 100 and can include an engine/motor 118, an energy source 119, a transmission 120, and wheels/tires 121, among other possible components. For example, the engine/motor 118 may be configured to convert the energy source 119 into mechanical energy and can correspond to one or a combination of an internal combustion engine, an electric motor, steam engine, or Stirling engine, among other possible options. For instance, in some implementations, the propulsion system 102 may include multiple types of engines and/or motors, such as a gasoline engine and an electric motor.

The energy source 119 represents a source of energy that may, in full or in part, power one or more systems of the vehicle 100 (e.g., an engine/motor 118). For instance, the energy source 119 can correspond to gasoline, diesel, other petroleum-based fuels, propane, other compressed gas-based fuels, ethanol, solar panels, batteries, and/or other sources of electrical power. In some implementations, the energy source 119 may include a combination of fuel tanks, batteries, capacitors, and/or flywheels.

The transmission 120 may transmit mechanical power from the engine/motor 118 to the wheels/tires 121 and/or other possible systems of the vehicle 100. As such, the transmission 120 may include a gearbox, a clutch, a differential, and a drive shaft, among other possible components. A drive shaft may include axles that connect to one or more of the wheels/tires 121.

The wheels/tires 121 of the vehicle 100 may have various configurations within example implementations. For instance, the vehicle 100 may exist in a unicycle, bicycle/motorcycle, tricycle, or car/truck four-wheel format, among other possible configurations. As such, the wheels/tires 121 may connect to the vehicle 100 in various ways and can exist in different materials, such as metal and rubber.

The sensor system 104 can include various types of sensors, such as a Global Positioning System (GPS) 122, an inertial measurement unit (IMU) 124, a radar 126, a laser rangefinder/LIDAR 128, a camera 130, a steering sensor 123, and a throttle/brake sensor 125, among other possible sensors. In some implementations, the sensor system 104 may also include sensors configured to monitor internal systems of the vehicle 100 (e.g., 02 monitor, fuel gauge, engine oil temperature, brake wear).

The GPS 122 may include a transceiver operable to provide information regarding the position of vehicle 100 with respect to the Earth. The IMU 124 may have a configuration that uses one or more accelerometers and/or gyroscopes and may sense position and orientation changes of vehicle 100 based on inertial acceleration. For example, the IMU 124 may detect a pitch and yaw of the vehicle 100 while the vehicle 100 is stationary or in motion.

The radar 126 may represent one or more systems configured to use radio signals to sense objects, including the speed and heading of the objects, within the local environment of the vehicle 100. As such, the radar 126 may include antennas configured to transmit and receive radio signals. In some implementations, the radar 126 may correspond to a mountable radar system configured to obtain measurements of the surrounding environment of the vehicle 100.

The laser rangefinder/LIDAR 128 may include one or more laser sources, a laser scanner, and one or more detectors, among other system components, and may operate in a coherent mode (e.g., using heterodyne detection) or in an incoherent detection mode. The camera 130 may include one or more devices (e.g., still camera or video camera) configured to capture images of the environment of the vehicle 100.

The steering sensor 123 may sense a steering angle of the vehicle 100, which may involve measuring an angle of the steering wheel or measuring an electrical signal representative of the angle of the steering wheel. In some implementations, the steering sensor 123 may measure an angle of the wheels of the vehicle 100, such as detecting an angle of the wheels with respect to a forward axis of the vehicle 100. The steering sensor 123 may also be configured to measure a combination (or a subset) of the angle of the steering wheel, electrical signal representing the angle of the steering wheel, and the angle of the wheels of the vehicle 100.

The throttle/brake sensor 125 may detect the position of either the throttle position or brake position of the vehicle 100. For instance, the throttle/brake sensor 125 may measure the angle of both the gas pedal (throttle) and brake pedal or may measure an electrical signal that could represent, for instance, an angle of a gas pedal (throttle) and/or an angle of a brake pedal. The throttle/brake sensor 125 may also measure an angle of a throttle body of the vehicle 100, which may include part of the physical mechanism that provides modulation of the energy source 119 to the engine/motor 118 (e.g., a butterfly valve or carburetor). Additionally, the throttle/brake sensor 125 may measure a pressure of one or more brake pads on a rotor of the vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of the vehicle 100. In other implementations, the throttle/brake sensor 125 may be configured to measure a pressure applied to a pedal of the vehicle, such as a throttle or brake pedal.

The control system 106 may include components configured to assist in navigating the vehicle 100, such as a steering unit 132, a throttle 134, a brake unit 136, a sensor fusion algorithm 138, a computer vision system 140, a navigation/pathing system 142, and an obstacle avoidance system 144. More specifically, the steering unit 132 may be operable to adjust the heading of the vehicle 100, and the throttle 134 may control the operating speed of the engine/motor 118 to control the acceleration of the vehicle 100. The brake unit 136 may decelerate vehicle 100, which may involve using friction to decelerate the wheels/tires 121. In some implementations, brake unit 136 may convert kinetic energy of the wheels/tires 121 to electric current for subsequent use by a system or systems of the vehicle 100.

The sensor fusion algorithm 138 may include a Kalman filter, Bayesian network, or other algorithms that can process data from the sensor system 104. In some implementations, the sensor fusion algorithm 138 may provide assessments based on incoming sensor data, such as evaluations of individual objects and/or features, evaluations of a particular situation, and/or evaluations of potential impacts within a given situation.

The computer vision system 140 may include hardware and software operable to process and analyze images in an effort to determine objects, environmental objects (e.g., stop lights, road way boundaries, etc.), and obstacles. As such, the computer vision system 140 may use object recognition, Structure From Motion (SFM), video tracking, and other algorithms used in computer vision, for instance, to recognize objects, map an environment, track objects, estimate the speed of objects, etc.

The navigation/pathing system 142 may determine a driving path for the vehicle 100, which may involve dynamically adjusting navigation during operation. As such, the navigation/pathing system 142 may use data from the sensor fusion algorithm 138, the GPS 122, and maps, among other sources to navigate the vehicle 100. The obstacle avoidance system 144 may evaluate potential obstacles based on sensor data and cause systems of the vehicle 100 to avoid or otherwise negotiate the potential obstacles.

As shown in FIG. 1, the vehicle 100 may also include peripherals 108, such as a wireless communication system 146, a touchscreen 148, a microphone 150, and/or a speaker 152. The peripherals 108 may provide controls or other elements for a user to interact with the user interface 116. For example, the touchscreen 148 may provide information to users of the vehicle 100. The user interface 116 may also accept input from the user via the touchscreen 148. The peripherals 108 may also enable the vehicle 100 to communicate with devices, such as other vehicle devices.

The wireless communication system 146 may wirelessly communicate with one or more devices directly or via a communication network. For example, the wireless communication system 146 could use 3G cellular communication, such as CDMA, EVDO, GSM/GPRS, or 4G cellular communication, such as WiMAX or LTE. Alternatively, the wireless communication system 146 may communicate with a wireless local area network (WLAN) using WiFi or other possible connections. The wireless communication system 146 may also communicate directly with a device using an infrared link, Bluetooth, or ZigBee, for example. Other wireless protocols, such as various vehicular communication systems, are possible within the context of the disclosure. For example, the wireless communication system 146 may include one or more dedicated short-range communications (DSRC) devices that could include public and/or private data communications between vehicles and/or roadside stations.

The vehicle 100 may include the power supply 110 for powering components. The power supply 110 may include a rechargeable lithium-ion or lead-acid battery in some implementations. For instance, the power supply 110 may include one or more batteries configured to provide electrical power. The vehicle 100 may also use other types of power supplies. In an example implementation, the power supply 110 and the energy source 119 may be integrated into a single energy source.

The vehicle 100 may also include the computer system 112 to perform operations, such as operations described therein. As such, the computer system 112 may include at least one processor 113 (which could include at least one microprocessor) operable to execute instructions 115 stored in a non-transitory computer readable medium, such as the data storage 114. In some implementations, the computer system 112 may represent a plurality of computing devices that may serve to control individual components or subsystems of the vehicle 100 in a distributed fashion.

In some implementations, the data storage 114 may contain instructions 115 (e.g., program logic) executable by the processor 113 to execute various functions of the vehicle 100, including those described above in connection with FIG. 1. The data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by the vehicle 100 and the computer system 112 during the operation of the vehicle 100 in the autonomous, semi-autonomous, and/or manual modes.

The vehicle 100 may include the user interface 116 for providing information to or receiving input from a user of the vehicle 100. The user interface 116 may control or enable control of content and/or the layout of interactive images that could be displayed on the touchscreen 148. Further, the user interface 116 could include one or more input/output devices within the set of peripherals 108, such as the wireless communication system 146, the touchscreen 148, the microphone 150, and the speaker 152.

The computer system 112 may control the function of the vehicle 100 based on inputs received from various subsystems (e.g., the propulsion system 102, the sensor system 104, and the control system 106), as well as from the user interface 116. For example, the computer system 112 may utilize input from the sensor system 104 in order to estimate the output produced by the propulsion system 102 and the control system 106. Depending upon the implementation, the computer system 112 could be operable to monitor many aspects of the vehicle 100 and its subsystems. In some implementations, the computer system 112 may disable some or all functions of the vehicle 100 based on signals received from the sensor system 104.

The components of the vehicle 100 could be configured to work in an interconnected fashion with other components within or outside their respective systems. For instance, in an example implementation, the camera 130 could capture a plurality of images that could represent information about a state of an environment of the vehicle 100 operating in an autonomous mode. The state of the environment could include parameters of the road on which the vehicle is operating. For example, the computer vision system 140 may be able to recognize the slope (grade) or other features based on the plurality of images of a roadway. Additionally, the combination of the GPS 122 and the features recognized by the computer vision system 140 may be used with map data stored in the data storage 114 to determine specific road parameters. Further, the radar unit 126 may also provide information about the surroundings of the vehicle.

In other words, a combination of various sensors (which could be termed input-indication and output-indication sensors) and the computer system 112 could interact to provide an indication of an input provided to control a vehicle or an indication of the surroundings of a vehicle.

In some implementations, the computer system 112 may make a determination about various objects based on data that is provided by systems other than the radio system. For example, the vehicle 100 may have lasers or other optical sensors configured to sense objects in a field of view of the vehicle. The computer system 112 may use the outputs from the various sensors to determine information about objects in a field of view of the vehicle, and may determine distance and direction information to the various objects. The computer system 112 may also determine whether objects are desirable or undesirable based on the outputs from the various sensors.

Although FIG. 1 shows various components of the vehicle 100, i.e., the wireless communication system 146, the computer system 112, the data storage 114, and the user interface 116, as being integrated into the vehicle 100, one or more of these components could be mounted or associated separately from the vehicle 100. For example, the data storage 114 could, in part or in full, exist separate from the vehicle 100. Thus, the vehicle 100 could be provided in the form of device elements that may be located separately or together. The device elements that make up the vehicle 100 could be communicatively coupled together in a wired and/or wireless fashion.

Figure 2:
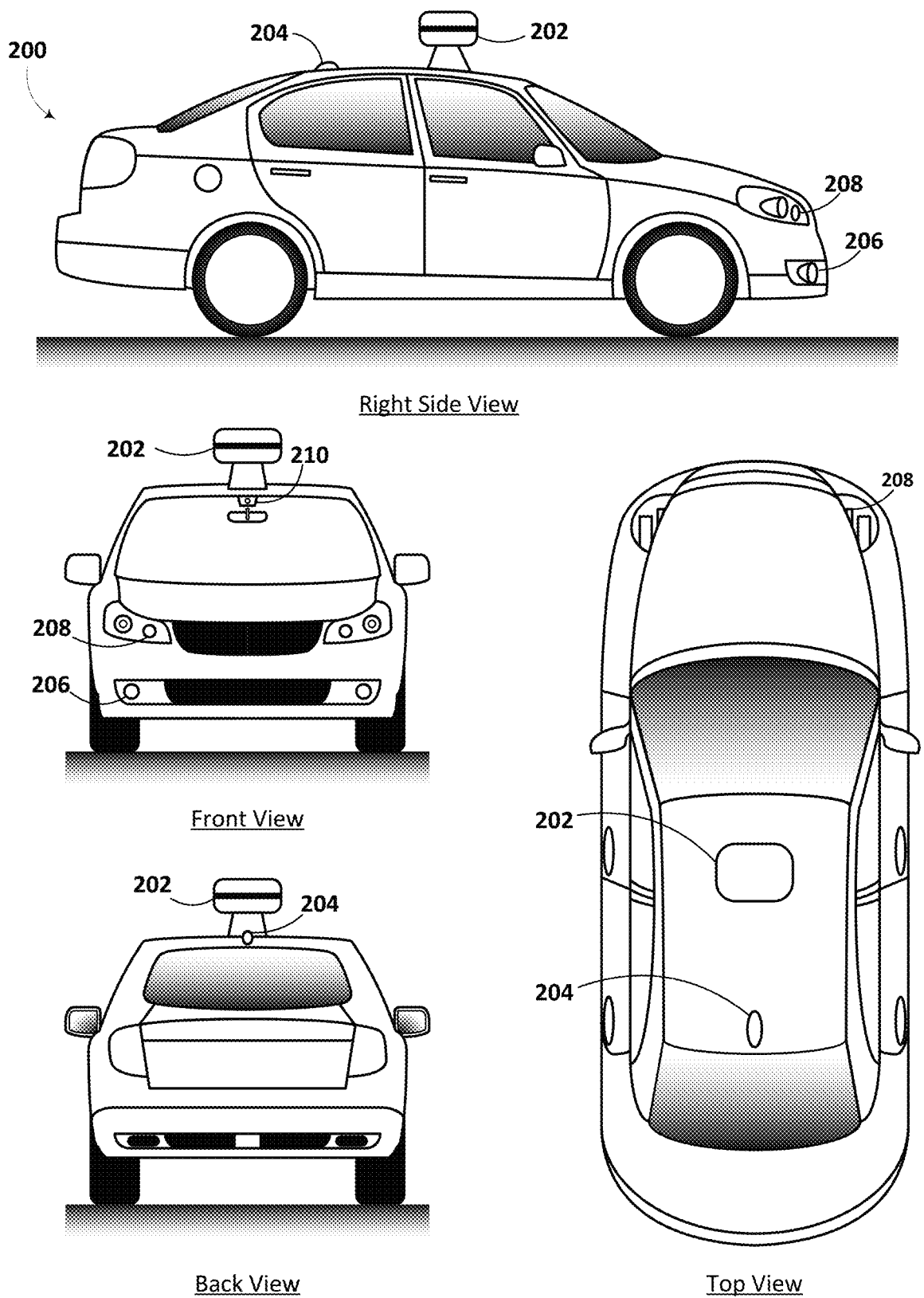
FIG. 2 is a conceptual illustration of a configuration of a vehicle, according to an example implementation.

FIG. 2 depicts an example physical configuration of the vehicle 200, which may represent one possible physical configuration of vehicle 100 described in reference to FIG. 1. Depending on the implementation, the vehicle 200 may include the sensor unit 202, the wireless communication system 204, the radio unit 206, the deflectors 208, and the camera 210, among other possible components. For instance, the vehicle 200 may include some or all of the elements of components described in FIG. 1. Although the vehicle 200 is depicted in FIG. 2 as a car, the vehicle 200 can have other configurations within examples, such as a truck, a van, a semi-trailer truck, a motorcycle, a golf cart, an off-road vehicle, or a farm vehicle, among other possible examples.

The sensor unit 202 may include one or more sensors configured to capture information of the surrounding environment of the vehicle 200. For example, the sensor unit 202 may include any combination of cameras, radars, LIDARs, range finders, radio devices (e.g., Bluetooth and/or 802.11), and acoustic sensors, among other possible types of sensors. In some implementations, the sensor unit 202 may include one or more movable mounts operable to adjust the orientation of sensors in the sensor unit 202. For example, the movable mount may include a rotating platform that can scan sensors so as to obtain information from each direction around the vehicle 200. The movable mount of the sensor unit 202 may also be movable in a scanning fashion within a particular range of angles and/or azimuths.

In some implementations, the sensor unit 202 may include mechanical structures that enable the sensor unit 202 to be mounted atop the roof of a car. Additionally, other mounting locations are possible within examples.

The wireless communication system 204 may have a location relative to the vehicle 200 as depicted in FIG. 2, but can also have different locations within implementations. The wireless communication system 200 may include one or more wireless transmitters and one or more receivers that may communicate with other external or internal devices. For example, the wireless communication system 204 may include one or more transceivers for communicating with a user's device, other vehicles, and roadway elements (e.g., signs, traffic signals), among other possible entities. As such, the vehicle 200 may include one or more vehicular communication systems for facilitating communications, such as dedicated short-range communications (DSRC), radio frequency identification (RFID), and other proposed communication standards directed towards intelligent transport systems.

The camera 210 may have various positions relative to the vehicle 200, such as a location on a front windshield of vehicle 200. As such, the camera 210 may capture images of the environment of the vehicle 200. As illustrated in FIG. 2, the camera 210 may capture images from a forward-looking view with respect to the vehicle 200, but other mounting locations (including movable mounts) and viewing angles of the camera 210 are possible within implementations. In some examples, the camera 210 may correspond to one or more visible light cameras. Alternatively or additionally, the camera 210 may include infrared sensing capabilities. The camera 210 may also include optics that may provide an adjustable field of view.

Figure 3:
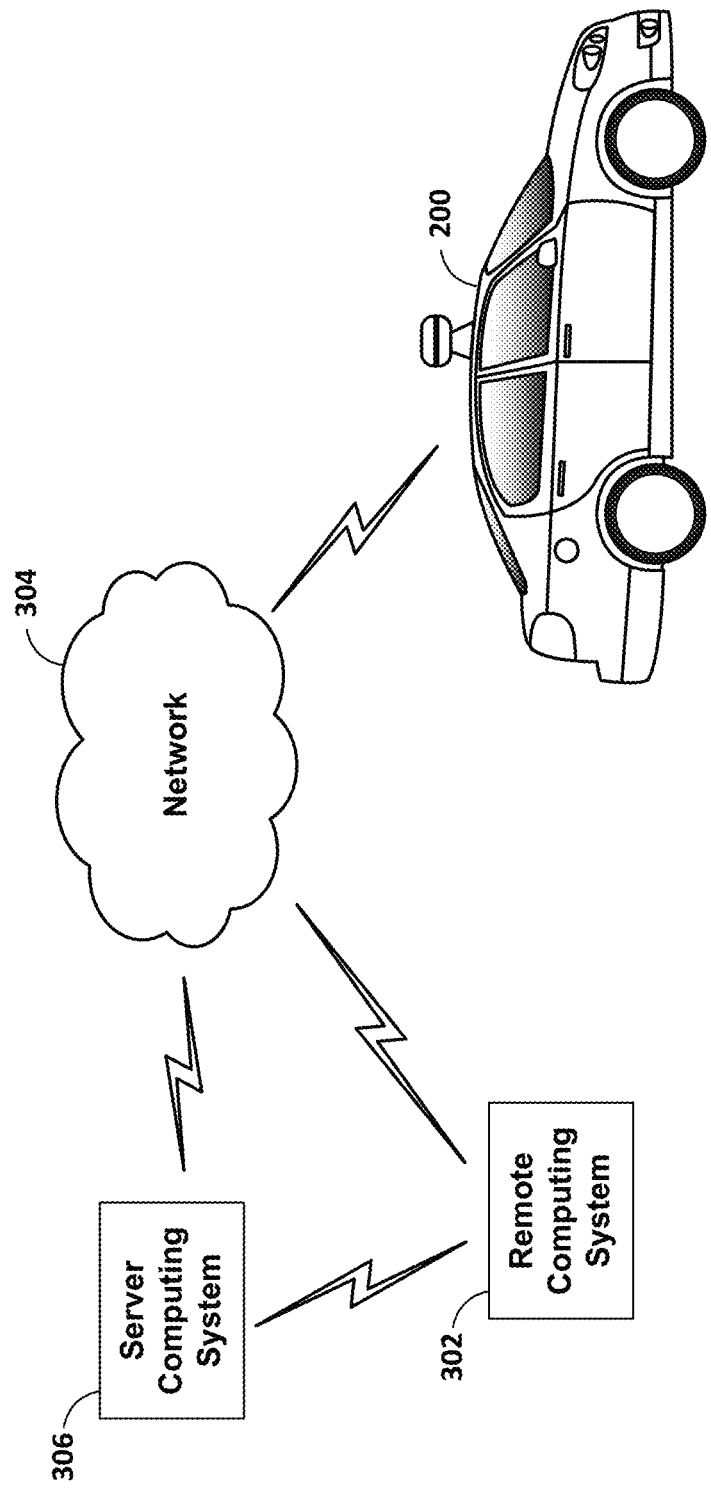
FIG. 3 is a conceptual illustration of wireless communication between various computing systems related to an autonomous vehicle, according to an example implementation.

FIG. 3 is a conceptual illustration of wireless communication between various computing systems related to an autonomous vehicle, according to an example implementation. In particular, wireless communication may occur between a remote computing system 302 and the vehicle 200 via a network 304. Wireless communication may also occur between a server computing system 306 and the remote computing system 302, and between the server computing system 306 and the vehicle 200.

The vehicle 200 can correspond to various types of vehicles capable of transporting passengers or objects between locations, and may take the form of any one or more of the vehicles discussed above. In some instances, the vehicle 200 may operate in an autonomous mode that enables a control system to safely navigate the vehicle 200 between destinations using sensor measurements. When operating in an autonomous mode, the vehicle 200 may navigate with or without passengers. As a result, the vehicle 200 may pick up and drop off passengers between desired destinations.

The remote computing system 302 may represent any type of device related to remote assistance techniques, including but not limited to those described herein. Within examples, the remote computing system 302 may represent any type of device configured to (i) receive information related to the vehicle 200, (ii) provide an interface through which a human operator can in turn perceive the information and input a response related to the information, and (iii) transmit the response to vehicle 200 or to other devices. The remote computing system 302 may take various forms, such as a workstation, a desktop computer, a laptop, a tablet, a mobile phone (e.g., a smart phone), and/or a server. In some examples, the remote computing system 302 may include multiple computing devices operating together in a network configuration.

The remote computing system 302 may include one or more subsystems and components similar or identical to the subsystems and components of vehicle 200. At a minimum, the remote computing system 302 may include a processor configured for performing various operations described herein. In some implementations, the remote computing system 302 may also include a user interface that includes input/output devices, such as a touchscreen and a speaker. Other examples are possible as well.

The network 304 represents infrastructure that enables wireless communication between the remote computing system 302 and the vehicle 200. The network 304 also enables wireless communication between the server computing system 306 and the remote computing system 302, and between the server computing system 306 and the vehicle 200.

The position of the remote computing system 302 can vary within examples. For instance, the remote computing system 302 may have a remote position from the vehicle 200 that has a wireless communication via the network 304. In another example, the remote computing system 302 may correspond to a computing device within the vehicle 200 that is separate from the vehicle 200, but with which a human operator can interact while a passenger or driver of the vehicle 200. In some examples, the remote computing system 302 may be a computing device with a touchscreen operable by the passenger of the vehicle 200.

In some implementations, operations described herein that are performed by the remote computing system 302 may be additionally or alternatively performed by the vehicle 200 (i.e., by any system(s) or subsystem(s) of the vehicle 200). In other words, the vehicle 200 may be configured to provide a remote assistance mechanism with which a driver or passenger of the vehicle can interact.

The server computing system 306 may be configured to wirelessly communicate with the remote computing system 302 and the vehicle 200 via the network 304 (or perhaps directly with the remote computing system 302 and/or the vehicle 200). The server computing system 306 may represent any computing device configured to receive, store, determine, and/or send information relating to the vehicle 200 and the remote assistance thereof. As such, the server computing system 306 may be configured to perform any operation(s), or portions of such operation(s), that is/are described herein as performed by the remote computing system 302 and/or the vehicle 200. Some implementations of wireless communication related to remote assistance may utilize the server computing system 306, while others may not.

The server computing system 306 may include one or more subsystems and components similar or identical to the subsystems and components of the remote computing system 302 and/or the vehicle 200, such as a processor configured for performing various operations described herein, and a wireless communication interface for receiving information from, and providing information to, the remote computing system 302 and the vehicle 200.

The various systems described above may perform various operations. These operations and related features will now be described. In line with the discussion above, a computing system (e.g., the remote computing system 302, or perhaps the server computing system 306, or a computing system local to the vehicle 200) may operate sensor-capture devices to capture sensor information (e.g., a camera to capture images) of the environment of an autonomous vehicle. In general, at least one computing system will be able to analyze the sensor information and possibly control the autonomous vehicle.

In some implementations, to facilitate autonomous operation a vehicle (e.g., the vehicle 200) may receive data representing objects in an environment in which the vehicle operates (also referred to herein as "environment data") in a variety of ways. A sensor system on the vehicle may provide the environment data representing objects of the environment. For example, the vehicle may have various sensors, including a camera, a radar unit, a laser range finder, a microphone, a radio unit, and other sensors. Each of these sensors may communicate environment data to a processor in the vehicle about information each respective sensor receives.

In one example, a camera may be configured to capture still images and/or video. In some implementations, the vehicle may have more than one camera positioned in different orientations. Also, in some implementations, the camera may be able to move to capture images and/or video in different directions. The camera may be configured to store captured images and video to a memory for later processing by a processing system of the vehicle. The captured images and/or video may be the environment data. Further, the camera may include an image sensor as described herein.

In another example, a radar unit may be configured to transmit an electromagnetic signal that will be reflected by various objects near the vehicle, and then capture electromagnetic signals that reflect off the objects. The captured reflected electromagnetic signals may enable the radar system (or processing system) to make various determinations about objects that reflected the electromagnetic signal. For example, the distance and position to various reflecting objects may be determined. In some implementations, the vehicle may have more than one radar in different orientations. The radar system may be configured to store captured information to a memory for later processing by a processing system of the vehicle. The information captured by the radar system may be environment data.

In another example, a laser range finder may be configured to transmit an electromagnetic signal (e.g., light, such as that from a gas or diode laser, or other possible light source) that will be reflected by a target objects near the vehicle. The laser range finder may be able to capture the reflected electromagnetic (e.g., laser) signals. The captured reflected electromagnetic signals may enable the range-finding system (or processing system) to determine a range to various objects. The range-finding system may also be able to determine a velocity or speed of target objects and store it as environment data.

Additionally, in an example, a microphone may be configured to capture audio of environment surrounding the vehicle. Sounds captured by the microphone may include emergency vehicle sirens and the sounds of other vehicles. For example, the microphone may capture the sound of the siren of an emergency vehicle. A processing system may be able to identify that the captured audio signal is indicative of an emergency vehicle. In another example, the microphone may capture the sound of an exhaust of another vehicle, such as that from a motorcycle. A processing system may be able to identify that the captured audio signal is indicative of a motorcycle. The data captured by the microphone may form a portion of the environment data.

In yet another example, the radio unit may be configured to transmit an electromagnetic signal that may take the form of a Bluetooth signal, 802.11 signal, and/or other radio technology signal. The first electromagnetic radiation signal may be transmitted via one or more antennas located in a radio unit. Further, the first electromagnetic radiation signal may be transmitted with one of many different radio-signaling modes. However, in some implementations it is desirable to transmit the first electromagnetic radiation signal with a signaling mode that requests a response from devices located near the autonomous vehicle. The processing system may be able to detect nearby devices based on the responses communicated back to the radio unit and use this communicated information as a portion of the environment data.

In some implementations, the processing system may be able to combine information from the various sensors in order to make further determinations of the environment of the vehicle. For example, the processing system may combine data from both radar information and a captured image to determine if another vehicle or pedestrian is in front of the autonomous vehicle. In other implementations, other combinations of sensor data may be used by the processing system to make determinations about the environment.

While operating in an autonomous mode, the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the environment (e.g., if there is actually a stop sign or if there is actually no stop sign present), (ii) confirm whether the vehicle's identification of the object is correct, (iii) correct the identification if the identification was incorrect and/or (iv) provide a supplemental instruction (or modify a present instruction) for the autonomous vehicle. Remote assistance tasks may also include the human operator providing an instruction to control operation of the vehicle (e.g., instruct the vehicle to stop at a stop sign if the human operator determines that the object is a stop sign), although in some scenarios, the vehicle itself may control its own operation based on the human operator's feedback related to the identification of the object.

To facilitate this, the vehicle may analyze the environment data representing objects of the environment to determine at least one object having a detection confidence below a threshold. A processor in the vehicle may be configured to detect various objects of the environment based on environment data from various sensors. For example, in one implementation, the processor may be configured to detect objects that may be important for the vehicle to recognize. Such objects may include pedestrians, street signs, other vehicles, indicator signals on other vehicles, and other various objects detected in the captured environment data.

The detection confidence may be indicative of a likelihood that the determined object is correctly identified in the environment, or is present in the environment. For example, the processor may perform object detection of objects within image data in the received environment data, and determine that the at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the environment in various way depending on the source of the environment data. In some implementations, the environment data may come from a camera and be image or video data. In other implementations, the environment data may come from a LIDAR unit. The vehicle may analyze the captured image or video data to identify objects in the image or video data. The methods and apparatuses may be configured to monitor image and/or video data for the presence of objects of the environment. In other implementations, the environment data may be radar, audio, or other data. The vehicle may be configured to identify objects of the environment based on the radar, audio, or other data.

In some implementations, the techniques the vehicle uses to detect objects may be based on a set of known data. For example, data related to environmental objects may be stored to a memory located in the vehicle. The vehicle may compare received data to the stored data to determine objects. In other implementations, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other implementations, the confidence threshold may be the same for all detected objects. When the confidence associated with a detected object is greater than the confidence threshold, the vehicle may assume the object was correctly recognized and responsively adjust the control of the vehicle based on that assumption.

When the confidence associated with a detected object is less than the confidence threshold, the actions that the vehicle takes may vary. In some implementations, the vehicle may react as if the detected object is present despite the low confidence level. In other implementations, the vehicle may react as if the detected object is not present.

When the vehicle detects an object of the environment, it may also calculate a confidence associated with the specific detected object. The confidence may be calculated in various ways depending on the implementation. In one example, when detecting objects of the environment, the vehicle may compare environment data to predetermined data relating to known objects. The closer the match between the environment data to the predetermined data, the higher the confidence. In other implementations, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 304), and in some implementations, via a server (e.g., server computing system 306). The human operator of the remote computing system may in turn use the environment data as a basis for responding to the request.

In some implementations, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing a velocity of vehicle (e.g., a speed and/or direction), among other possible adjustments.

In other implementations, even if the vehicle detects an object having a confidence that meets or exceeds the threshold, the vehicle may operate in accordance with the detected object (e.g., come to a stop if the object is identified with high confidence as a stop sign), but may be configured to request remote assistance at the same time as (or at a later time from) when the vehicle operates in accordance with the detected object.

Figure 4:
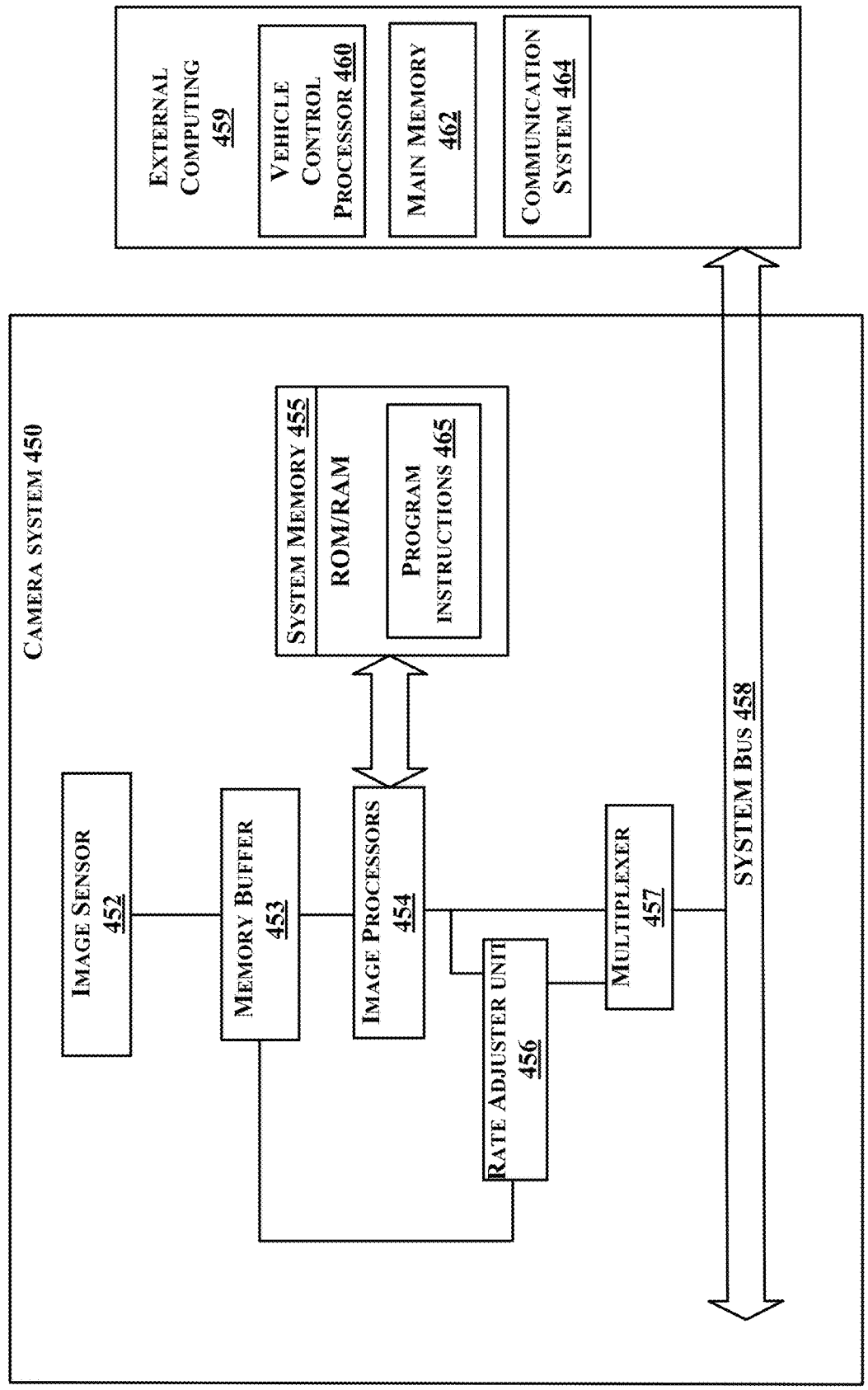
FIG. 4 is a simplified block diagram depicting components of a camera system, according to an example implementation.

FIG. 4 is a diagram of an illustrative camera or imaging system 450 of a vehicle that uses an image sensor to capture images. The camera system 450 may correspond to an image capture device or the camera 130 of FIG. 1. In some examples, the vehicle may include more than one camera system 450. For example, a vehicle may include one camera system mounted to a top of the vehicle in a sensor dome and another camera system located behind the windshield of the vehicle. In other examples, the various camera system may be located in various different positions throughout the vehicle.

The camera system 450 may include an image sensor 452, a memory or image buffer 453, a processor or processing circuitry 454, system memory 455, a rate adjusting unit or rate limiter 456, and a multiplexer 457. In exemplary implementations, the vehicle may include more than one image sensor 453, memory buffer 453, processor 454, rate adjusting unit 456 and/or multiplexer 457. The camera system 450 may be configured to transmit image data to the components and/or systems of the vehicle via a system bus 458. Although various components of the camera system 450 are shown as distributed components, it should be understood that any of such components may be physically integrated and/or distributed according to a desired configuration of the computing system.

The image sensor 452 of the camera system 450 may capture image or pixel data and transmit the image data to the memory buffer 453. The image sensor 452 may be implemented using any suitable image sensor technology, including a charge coupled device (CCD) or a complementary metal oxide semiconductor (CMOS) image sensor. The image sensor 452 may include pixel or sensor cells arranged in a two-dimensional grid or array of rows and columns to detect image data. The image sensor 452 may have any number of pixel cells (e.g., hundreds or thousands or more). In some examples, the array of the image sensor 452 may be configured as a square array with the same number of rows and columns. In other examples, the array may be configured as a rectangular array with a different number of rows and columns. For example, the array may be wider than it is tall (e.g., may have more vertical columns than horizontal rows).

During operation, the pixel cells of the image sensor 452 may receive light by way of an optical system (not shown) and convert the light into electrical signals. The electrical signals may correspond to the color and intensity of light that is received by the pixel cells. The image sensor 452 may be configured to sample or scan the pixel cells to generate image data from which an image may be reconstructed. For example, the pixel cells may be sampled or scanned one row at a time. Sampling in this way is known as a rolling shutter. In some exemplary implementations, the sampling may be performed on the columns of the pixel cells in a sequential or non-sequential order.

When the pixel cells of the image sensor 452 are sampled, the image data associated with each pixel cell may be captured by the image sensor 452 to generate data elements of an image frame. The data elements of the image frame may be representative of a two-dimensional image of an environment (e.g., a still image or a single image frame of a video sequence). After the data elements of the image frame are generated by the image sensor 452, the data elements may be arranged or organized in a serial order in a data stream. The serial order of the data elements may correspond to the order that the pixel cells of the image sensor 452 have been sampled or scanned. The data elements of the image frame may then be sent in the data stream to the memory buffer 453.

The memory buffer 453 of the camera system 450 may be communicatively coupled to the image sensor 452 and the processor 454. In some exemplary implementations, the memory buffer 453 may be part of the image sensor 452 or the processor 454. The memory buffer may be configured to receive a sequence of image frames from the image sensor 452. For example, the memory buffer 453 may receive data elements of an image frame and temporary store the data elements in the memory buffer 453 to facilitate processing before transmitting or transferring the data elements to other components (e.g., a main memory) and/or systems of the vehicle via the system bus 458. The data elements of each image frame may be received by the memory buffer 453 in a data stream in a serial order. For example, the data elements of each image may be received in a row-by-row format (e.g., a row-major or row-wise serial order) or a column-by-column format (e.g., a column-major or column-wise serial order).

As the memory buffer 453 receives the data elements of the image frame, the memory buffer 453 may write the data elements to a memory array in the memory buffer 453. The memory array may include memory locations or cells configured to store a single bit or multiple bits of image data (e.g., image or pixel data). The memory buffer 453 may include any suitable number of memory arrays configured to store the data elements of image frames. The memory locations of the array may be arranged as a two-dimensional matrix or array of random access memory (RAM) or other addressable memory. The number of memory locations of the array (e.g., image buffer size) may be equal to the number of data elements in each image frame in the sequence of image frames. In exemplary implementations, the number of memory locations may be greater than the number of data elements in each image frame in the sequence; however, the number of memory locations that may be utilized may equal the number of data elements in each image frame in the sequence.

In order to write the data elements of an image frame in the memory buffer 453, the memory buffer 453 may include write control circuitry (not shown) configured to select the memory locations of the memory array for writing the data elements of the image frame. For example, the write control circuitry may generate write select signals for selecting the memory locations of the memory array and writing the data elements of the image frame to the memory locations. Each of the rows of the memory array may be addressable by a row address and each of the columns of the memory array may be addressable by a column address. As such, the write control circuitry selects the memory locations in the memory array and writes the data elements of the image frame to the memory locations. In exemplary implementations, the write control circuitry may serially write the data elements of the image frame in the memory locations of the memory array in the order received by the memory buffer 453. For example, the write control circuitry may write the data elements of the image to the memory locations in a row-major order or a row-wise order.

The memory buffer 453 may implement any suitable buffering configuration, for example, a first-in, first-out (FIFO) buffer configured to read data in the same sequence that the data was written and stored into the buffer. In some exemplary implementations, the memory buffer 453 may be configured to reorder or transform the data elements of an image frame. For example, the data elements of the image frame may be written into the memory buffer 453 in a first serial order (e.g., a row major order) and may be read out of the memory buffer 453 in a second serial order (e.g., a column major order).

While the data elements of the image frame are being written in the memory buffer 453, the data elements that have already been stored in the memory buffer 453 may be read by the processor 454 and the processor 454 may perform image processing operations on the data elements. When all of the data elements of an image frame have been written in the memory buffer 453, the unread data elements may be read or flushed by the processor 454. For example, once the memory buffer 453 determines that the data elements of the image frame have been written in the memory buffer 453, the data elements that have not been read out may be flushed to the processor 453 and transmitted to the components and/or systems of the vehicle via the system bus 458. For example, the data elements of the image frame may be sent to a main memory via the system bus 458.

The memory buffer 453 may be configured to determine or detect when the writing operations for writing the data elements of an image frame in the memory buffer 453 have completed. For example, the memory buffer 453 may include a write counter (not shown) to determine the number of the data elements of an image frame that have been written to the memory buffer 453. The write counter may be configured to generate a value corresponding to the number of write operations performed by the memory buffer 453. For example, the write counter may be initially set to zero and may be incremented by one when a data element of the image frame is written to the memory buffer 453. After each write operation, the value of the write counter may be compared to the number of data elements of the image frame. Each image frame may have a predetermined number of data elements or the number of data elements may be selected or determined by the image sensor 452. When the value of the write counter equals or exceeds the number of data elements of the image frame, the memory buffer 453 may determine that the write operations for writing the data elements of an image frame in the memory buffer 453 have completed.

In some exemplary implementations, the memory buffer 453 may determine that the write operations for writing the data elements of an image frame to the memory buffer 453 have completed based on a signal or an indicator from the image sensor 452. For example, the image sensor 452 may send a signal to the memory buffer 453 indicating an end of the image frame or an end of a data segment (e.g., an end of a row or column) of the image frame. The memory buffer 453 may also be configured to determine or detect that the last data element of an image frame has been written in the last memory location of the memory buffer 453 based on accessing data stored in the memory buffer 453 or in a register. In other exemplary implementations, the memory buffer 453 may determine that the write operations have completed based on a prediction that the data elements of an image frame may be written to the memory buffer 453 in a predetermined time period. For example, the memory buffer 453 may calculate a time period for the data elements of an image frame to be written into the memory buffer 453 based on a data transmission or transfer rate that the memory buffer 453 receives the data elements from the image sensor 452. Once the time period has elapsed, the memory buffer 453 may infer that the memory buffer 453 has been filled with the data elements of the image frame.

Once the memory buffer 453 determines or infers that the memory buffer 453 has been filled and/or that the write operations have completed, the data elements of the image frame stored in the memory buffer 453 may be read out or flushed from the memory buffer 453. The memory buffer 453 may inform the processor 454 that the write operations for writing the data elements of the image frame to the memory buffer 453 have been completed. For example, the memory buffer 453 may generate a signal (e.g., a write complete signal or an end of frame signal) and send the signal to the processor 454 indicating that the data elements of an image frame have been written in the memory buffer 453. The memory buffer 453 may also send the signal (e.g., the write complete signal or the end of frame signal) to the multiplexer 457 indicating that the write operations have completed. After the signal is sent to the processor 454 and/or multiplexer 457, the write counter may be reinitialized or reset to zero.

After the processor 454 receives the signal (e.g., the write complete signal or the end of frame signal) from the memory buffer 453 indicating that the data elements of the image frame have been written into the memory buffer 453, the processor 454 may enter into a flushing mode or state. In a flushing mode, the processor 454 may initiate a flushing operation to read out or flush one or more of the data elements of the image frame from the memory buffer 453. For example, the processor 454 may generate a request (e.g., a flushing request or command) for flushing the memory buffer 453 and may send the request to the memory buffer 453. When the memory buffer 453 receives the request, one or more of the data elements of the image frame stored in the memory buffer 453 may be flushed. In exemplary implementations, the data elements in the memory buffer 453 that have not been previously read out by the processor 454 may be flushed. For example, in response to the flushing request sent by the processor 454 to the memory buffer 453, the unread data elements of the image frame may be read out or flushed from the memory buffer 453 by the processor 454.

After the memory buffer 453 receives the request or command (e.g., the flush request/command) from the processor 454, the data elements may be read out from the memory buffer 453 for transmission to the processor 454. The data elements of each image frame may be serially read from the memory buffer 453 and arranged in consecutive groups of rows or columns in a data stream (e.g., a row-by-row format or a column-by-column format). As such, the memory buffer 453 may store the data elements of an image frame from the image sensor 452 and the processor 454 may be configured to read the data elements of the image frame from the memory buffer 453 to flush the memory buffer 453. The data elements may be read out in the same or a different serial order than the order that the data elements were written in the memory buffer 453. For example, the data elements of the image frame may be stored in the memory buffer 454 in a row-major order and may be read in a column-major order.

In order to read the data elements of an image frame stored in the memory buffer 453, the memory buffer 453 may include read control circuitry (not shown) configured to select the memory locations of the memory buffer 453 for reading the data elements stored in the memory array of the memory buffer 453. For memory read operations, the read control circuitry may generate a read select signal for selecting memory locations of the memory array and for reading the data elements of the image frame from the memory locations. For example, each of the rows of the memory array may be addressable by a row address and each of the columns of the memory array may be addressable by a column addresses.

The memory buffer 453 may be configured to determine or detect when the read operations for reading the data elements of an image frame from the memory buffer 453 have been completed. For example, the memory buffer 453 may include a read counter (not shown) to determine the number of the data elements of an image frame that have been read from the memory buffer 453. The read counter may be configured to generate a value corresponding to the number of read operations performed by the memory buffer 453. For example, the read counter may be initially set to zero and may be incremented by one when a data element of an image frame is read from the memory buffer 453. After each read operation, the value of the read counter may be compared to the number of data elements of the image frame. When the value of the read counter equals or exceeds the number of data elements of an image frame, the memory buffer 453 may determine that the read operations for reading the data elements from the memory buffer 453 have been completed.

After the data elements have been read out or flushed from the memory buffer 453, the memory buffer 453 may notify the processor 454 that the flushing operation is complete. For example, when the value of the read counter is equal to or greater than the number of data elements of an image frame, the memory buffer 453 may send a notification or signal to the processor 454 indicating that the data elements have been read out of the memory buffer 454.

After the memory buffer 453 reads out or flushes the data elements of the image frame, the data elements may be transmitted to the processor 454. The memory buffer 453 may be configured to send the data elements of the image frame to the processor 454 in a data stream at a data transmission or transfer rate (e.g., a bit rate). While the data elements of the image frame are transmitted to the processor 454, the data elements of a next image frame may be written to the memory buffer 453 and the process may be repeated for flushing or reading out the data elements of the next image frame by the processor 454.

Referring still to FIG. 4, the system memory 455 of the camera system 450 may be any type of memory including but not limited to volatile memory (such as RAM), non-volatile memory (such as ROM, flash memory, etc.) or any combination thereof. In some examples, the system memory 455 may be a memory cache to temporarily store image data. The system memory 455 may include program instructions 465 that are executable by the processor 454 to facilitate the various functions described herein. For example, image and/or video compression algorithms may be stored in the system memory 455 and executed by the processor 454.

The processor 454 of the camera system 450 may be communicatively coupled to the memory buffer 453, the rate adjustment unit 456, the multiplexer 457, and the system memory 455. The processor 454 may act as an interface between the memory buffer 453 and the components and/or systems coupled to the system bus 458. In exemplary implementations, the processor 454 may have a communication port for communicating with the memory buffer 453 and a communication port for communicating with the rate adjustment unit 456 and the multiplexer 457.

The processor 454 may include any type of processor including, but not limited to, a microprocessor, a microcontroller, a digital signal processor (DSP), an image processor, or any combination thereof. The processor 453 may perform image processing functions on the image data (e.g., the data elements of the image frame) captured from the image sensor, such as transformations, demosaicing, image sharpening, filtering, cropping, thresholding, noise reduction, contrast adjustments, background subtraction, convolution, interpolation and/or other processing of the image data. In addition, the processor 454 may apply any of a number of data reduction techniques to the image data, such as redundancy avoidance, lossless compression, and lossy compression.

The processor 454 may be operable to process data at a processing speed. The processing speed may be the rate (e.g., processing rate) at which the processor processes data. For example, the data elements of the image frame may be transmitted to the processor 454 at a data transmission or transfer rate (e.g., a bit rate) that the processor processes data. In exemplary implementations, the data elements of an image frame may be transmitted to the processor 454 at a data transmission or transfer rate that corresponds to a processing rate that the processor uses to flush data from the processor 454. For example, the processor may be configured to flush image data at a maximum processing rate and image data may be transmitted to the processor 454 at the maximum processing rate.

The processor 454 may be configured to determine or detect that the memory buffer 453 has been filled with the data elements of an image frame and to read out or flush the data elements from the memory buffer 453. For example, the processor 454 may receive a signal or command (e.g., a write complete signal or an end of frame signal) from the memory buffer 453 indicating that the write operations for writing the data elements of an image frame into the memory buffer 453 have completed.

Once the processor 454 receives the signal indicating that the memory buffer 453 has been filled and/or the write operation of the memory buffer have completed, the processor 454 may enter into a flushing state or mode. In a flushing state, the processor 454 may initiate a flushing operation to flush or a read out one or more of the data elements of the image frame stored in the memory buffer 453. For example, the processor 454 may generate a request (e.g., a flushing request or command) and may send the signal to the memory buffer 453.

In response to the request (e.g. the flushing request or command) from the processor 454, the memory buffer 453 may retrieve the unread data elements of the image frame stored in the memory buffer 453. The memory buffer 453 may be operable to retrieve the stored data elements at a data transfer rate. The data transfer rate of the storage device may be the amount of data in a certain period of time that the memory buffer 453 is able to transfer or transmit. In exemplary implementations, the data transfer rate substantially matches the processing speed of the processor 454. Thus, the data transfer rate at which the memory buffer 453 is able to provide the data elements to the processor 454 may be similar to the processing rate at which the processor 454 is able to process data.

After the data elements of an image frame have been retrieved by the memory buffer 453, the data elements may be transmitted or transferred to the processor 454. Once the processor 454 receives the data elements of the image frame from the memory buffer 453, the processor 454 may output the data elements. In exemplary implementations, the processor 454 may output the data elements of the image frame to the rate adjustment unit 456 and multiplexer 457 at a data transmission or transfer rate (e.g., bit rate). To achieve maximum throughput, the processor 454 may flush or output the data elements at a maximum data transmission rate to the rate adjustment unit 456 and the multiplexer 457.

The rate adjustment unit 456 may be communicatively coupled to the processor 454 and an input of the multiplexer 457. The rate adjustment unit 456 may adjust or control the data transmission rate of the data elements of the image frame from the processor 454 to the multiplexer 457. The rate adjustment unit 456 may use any suitable hardware and/or rate reduction techniques to reduce the data transmission or transfer rate (e.g., bit rate) of the data elements of the image frame.

The rate adjustment unit 456 may be configured to receive the data elements of an image frame transferred from the processor 454 at a first data transmission or transfer rate (e.g., a first bit rate) and output the image data to the multiplexer 457 at a second data transmission or transfer rate (e.g., a second bit rate). For example, the rate adjustment unit 456 may output the data elements of an image frame at a lower data transmission rate (e.g., a lower bit rate) than the data elements were received by the rate adjustment unit 456. In exemplary implementations, the rate adjustment unit 456 may receive the data elements of the image frame at the maximum data transmission rate of the processor 454 and output the data elements at a lower data transmission rate (e.g., lower bitrate) to the multiplexer 457. In some exemplary implementations, the rate adjustment unit 456 may be configured to select a data transmission rate for outputting or transmitting the data elements of an image frame (e.g., image data) based on a request from a component and/or system coupled to the system bus 458.

The multiplexer 457 may have an input communicatively coupled to the processor 454 and an input communicatively coupled to the output of the rate adjustment unit 456. The multiplexer 457 may also have an output that is communicatively coupled to the system bus 458. The multiplexer 457 may be configured to receive the data elements of an image frame from the processor 454 at the first data transmission rate (e.g., a first bit rate) and to receive the data elements of the image frame from the rate adjustment unit 456 at a second data transmission rate (e.g., a second bit rate).

The multiplexer 457 may be configured to select the data elements of the image frame received from the processor 454 or the data elements of the image frame received from rate adjustment unit 456 for transmission to the system bus 458 based on a signal or a command from the memory buffer 453. For example, the multiplexer 457 may receive a signal or command (e.g., a write complete signal) from the memory buffer 453 after the write operations for writing the data elements of the image frame to memory buffer 453 have completed. In response to the write complete signal, the multiplexer 457 may select the data elements of the image frame received from the rate adjustment unit 456 and transmit the data elements onto the system bus 458. When the multiplexer 457 selects the data elements of the image frame from the rate adjustment unit 456 for transmission to the system bus 458, the transmission of the data elements at the lower data transmission rate may prevent the system bus 458 from being overrun, prevent data from being lost, decrease bus latency, and improve performance of the components connected to the system bus 458.

The system bus 458 of the camera system 450 may be coupled to the output of the multiplexer 457 and to other components and/or systems of the vehicle. The system bus 458 can be implemented using any suitable communication technology and includes connection technologies that allow multiple components to share the system bus 458. The system bus 458 may be configured to enable the transfer of the data elements of an image frame (e.g., image data) between the various components and systems of the vehicle. For example, the data elements of an image frame may be sent by the multiplexer 458 to an external computing device 459 via the system bus 458.

The external computing device 459 may be used for longer term storage and/or processing of images. The external computing device 459 may be configured with a larger memory than the system memory 455 of the camera system 450. For example, the image frames sent to the external computing device 459 may be used by a navigation system (e.g. a navigation processor) of the autonomous vehicle. The external computing device 459 may be located in the vehicle itself, but as a separate system from the camera system 450. The external computing device 459 may include a vehicle-control processor 460, a main memory 462, a communication system 464, and other components. The communication system 464 may be configured to communicate data between the vehicle and a remote computer server.

Figure 5:
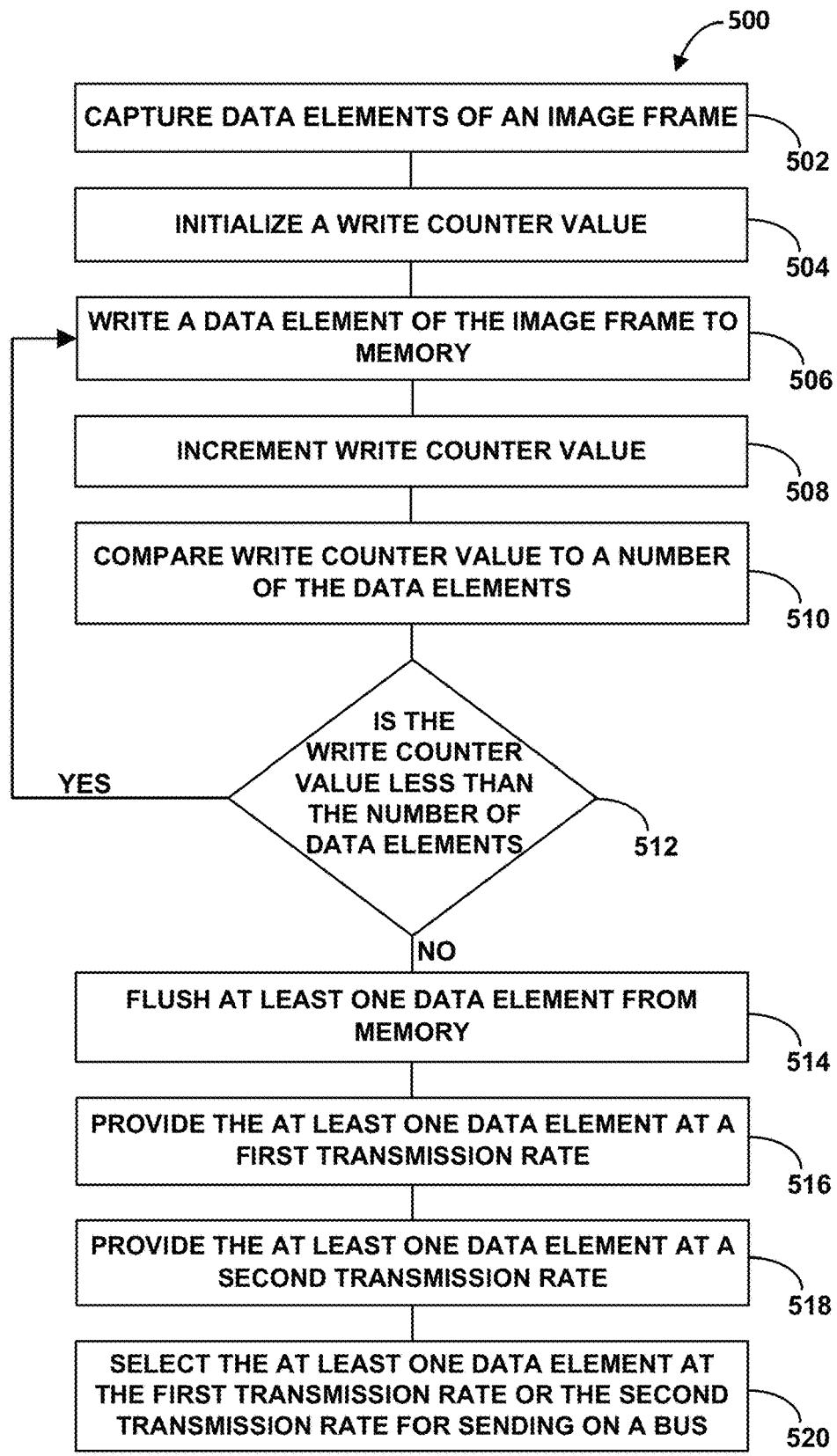
FIG. 5 is a flow chart of a method, according to an example implementation.

FIG. 5 is a flow chart of a method 500 for transmitting or transferring image data, according to an example implementation. Method 500 represents an example method that may include one or more operations as depicted by one or more blocks 502-520, each of which may be carried out by any of the systems shown in FIGS. 1-4, among other possible systems. In an example implementation, an image system (e.g., an image capture device) or a computing system (e.g., a camera system 450) performs the illustrated operations, although in other implementations, one or more other systems (e.g., server computing system 306) can perform some or all of the operations.

Those skilled in the art will understand that the flow charts described herein illustrates functionality and operations of certain implementations of the present disclosure. In this regard, each block of the flowcharts may represent a module, a segment, or a portion of program code, which includes one or more instructions executable by one or more processors for implementing specific logical functions or steps in the processes. The program code may be stored on any type of computer readable medium, for example, such as a storage device including a disk or hard drive.

In addition, each block may represent circuitry that is wired to perform the specific logical functions in the processes. Alternative implementations are included within the scope of the example implementations of the present application in which functions may be executed out of order from that shown or discussed, including substantially concurrent or in reverse order, depending on the functionality involved, as would be understood by those reasonably skilled in the art. Within examples, any system may cause another system to perform one or more of the operations (or portions of the operations) described below.

In line with the discussion above, a computing system or an image system (e.g., an image capture device, a camera system 450, remote computing system 302, or server computing system 306) may operate as shown by method 500. At block 502, an image sensor may capture image data (e.g. data elements of an image frame) associated with an environment. For example, the image sensor may be configured with a plurality of pixel or sensor cells aligned in a plurality of horizontal rows and a plurality of vertical columns. In exemplary implementations, the image sensor may have a two-dimensional array of pixel or sensor cells that may be utilized to capture the image data. To capture the image data, the pixel or sensor cells of the image sensor may be sampled or scanned to obtain image data. The sampling may be performed across at least one of the horizontal rows of the pixel cells of the image sensor. After each pixel cell of a row has been sampled, a new row may be sampled to create another row of image data. The rows may be sampled iteratively until all the rows have been sampled. In one embodiment, the image sensor may be sampled with a rolling shutter that samples the pixel cells of the image sensor in horizontal rows or vertical columns. The image data captured from the image sensor may be used to form an image (e.g., data elements of an image frame). The image frame may represent a two-dimensional image having rows of data elements and columns of data elements.

The data elements of the image frame may be organized in a data stream and transmitted from the image sensor to a memory, such as the memory buffer 453 of FIG. 4. The data elements of the image frame may be arranged in the stream in a row-by-row format (e.g., consecutive rows of an image frame) or a column-by-column format (e.g., consecutive columns of an image frame).

The memory may be configured to receive the data elements of the image frame from the image sensor and initialize a value of a write counter at block 504. For example, the value of the write counter may be set to zero. As the memory receives the data elements of the image frame, the memory may write each data element of the image frame to a memory array of the memory at block 506. The memory array may include memory locations or cells configured to store a single bit or multiple bits of data (e.g., image or pixel data). The memory may include any suitable number of memory arrays configured to store the data elements of an image frame. The memory locations of the array may be arranged as a two-dimensional matrix or array of random access memory (RAM) or other addressable memory.

After each data element of an image frame is written in the memory, the value of the write counter may be incremented at block 508. At block 510, the value of the write counter may be compared to the number of data elements of the image frame. Based on the comparison, the memory may determine that the memory is full and/or that the writing operations for writing the data elements of an image frame in the memory have completed at block 512. If the value of the write counter is less than the number of data elements of the image frame, the write operations may not have completed and the memory may write the next data element into the memory at block 504. If the value of the write counter is greater than or equal to the number of data element of the image frame, the write operations for writing the data elements in the memory have been completed. Once the write operations have been completed, a signal or command (e.g., a write complete signal) may be generated indicating that the write operations have been completed. The signal may be generated by the memory and sent to a processor, such as the processor 454 of FIG. 4, and/or a multiplexer, such as the multiplexor of 457 of FIG. 4.

At block 514, at least one data element of the image frame may be flushed or read out from the memory. For example, when the value of the write counter is equal to or greater to the number of data elements, the write operations may be complete and the processor may flush or empty one or more data elements of the image frame from the memory. In exemplary implementations, the processor may enter into a flushing state or mode when the processor receives the signal (e.g., the write complete signal) from the memory. In a flushing state, the processor may initiate a flushing operation to read out one or more of the data elements of the image frame from the memory. In exemplary implementations, the processor may generate a request (e.g., a flushing request or command) and may send the request to the memory for flushing one or more of the data elements in the memory. For example, when the memory receives the signal from the processor, the memory may retrieve one or more of the data elements that have not been read out by the processor and transmit the one or more data elements to the processor.

At block 516, at least one data element of the image frame may be provided at a first data transmission rate (e.g., a first bit rate). For example, when the processor receives the one or more data elements from the memory, the processor may output the one or more data elements of the image frame at a first data transmission or transfer rate. The at least one data element of the image frame may also be provided at a second data transmission or transfer rate at block 518. For example, a rate adjustment unit, such as the rate adjustment unit 456 of FIG. 4, may be configured to receive the one or more data elements of the image frame from the processor at the first data transmission rate and output the one or more data elements to the multiplexer at a second data transmission rate. In exemplary implementations, the rate adjustment unit may output the one or more data elements of the image frame at a lower data transmission rate (e.g., a lower bit rate) than the data elements were received by the rate adjustment unit. For example, the rate adjustment unit may receive the one or more data elements of the image frame at a maximum data transmission rate of the processor and output the one or more data elements at a lower data transmission rate (e.g., a lower bit rate) to a multiplexer, such as the multiplexer 457 in FIG. 4.

At block 518, the at least one data element of the image frame at the first data transmission rate or the second data transmission rate may be selected for transmission on a bus. For example, the multiplexer may be configured to receive the data elements of an image frame from the processor at the first data transmission rate and to receive the data elements of the image frame from the rate adjustment unit at the second data transmission rate. The multiplexer may be configured to select the data elements received from the processor or the data elements received from the rate adjustment unit for transmission on the bus based on a signal from the memory. For example, the multiplexer may receive a signal (e.g., a write complete signal) from the memory after the write operations for writing the data elements of an image frame to memory have completed. In response to the write complete signal, the multiplexer may select the one or more data elements of an image frame received from the rate adjustment unit and may transmit the one or more data elements onto the bus. When the multiplexer selects the data elements of the image frame from the rate adjustment unit to output on the bus, the transmission of the data elements at the lower transmission rate may prevent the bus from being overrun, prevent data from being lost, decrease bus latency, and improve performance of the components connected to the system bus.

FIG. 6 is a schematic diagram of a computer program, according to an example implementation. In some implementations, the disclosed methods may be implemented as computer program instructions encoded on a non-transitory computer-readable storage media in a machine-readable format, or on other non-transitory media or articles of manufacture.

In an example implementation, computer program product 600 is provided using signal bearing medium 602, which may include one or more programming instructions 604 that, when executed by one or more processors may provide functionality or portions of the functionality described above with respect to FIGS. 1-4. In some examples, the signal bearing medium 602 may encompass a non-transitory computer-readable medium 606, such as, but not limited to, a hard disk drive, a CD, a DVD, a digital tape, memory, components to store remotely (e.g., on the cloud) etc. In some implementations, the signal bearing medium 602 may encompass a computer recordable medium 608, such as, but not limited to, memory, read/write (R/W) CDs, R/W DVDs, etc. In some implementations, the signal bearing medium 602 may encompass a communications medium 610, such as, but not limited to, a digital and/or an analog communication medium (e.g., a fiber optic cable, a waveguide, a wired communications link, a wireless communication link, etc.). Similarly, the signal bearing medium 602 may correspond to a remote storage (e.g., a cloud). A computing system may share information with the cloud, including sending or receiving information. For example, the computing system may receive additional information from the cloud to augment information obtained from sensors or another entity. Thus, for example, the signal bearing medium 602 may be conveyed by a wireless form of the communications medium 610.

The one or more programming instructions 604 may be, for example, computer executable and/or logic implemented instructions. In some examples, a computing device such as the computer system 112 of FIG. 1 or remote computing system 302 and perhaps server computing system 306 of FIG. 3 or one of the processor of FIG. 4 may be configured to provide various operations, functions, or actions in response to the programming instructions 604 conveyed to the computer system 112 by one or more of the computer readable medium 606, the computer recordable medium 608, and/or the communications medium 610.

The non-transitory computer readable medium could also be distributed among multiple data storage elements and/or cloud (e.g., remotely), which could be remotely located from each other. The computing device that executes some or all of the stored instructions could be a vehicle, such as vehicle 200 illustrated in FIG. 2. Alternatively, the computing device that executes some or all of the stored instructions could be another computing device, such as a server.

The above detailed description describes various features and operations of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

What is claimed is:

1. An apparatus comprising:
    a processor configured to initiate a flushing operation to output image data at a first transmission rate; and
    a multiplexing device configured to receive the image data from the processor at the first transmission rate and to receive the image data from a rate limiter at a second transmission rate, wherein the multiplexer device is configured to select at least one of the image data at the first transmission rate or the image data at the second transmission rate based on an input.

2. The apparatus of claim 1, wherein the rate limiter is configured to receive the image data from the processor at the first transmission rate and to output the image data at the second transmission rate.

3. The apparatus of claim 1, further comprising a memory buffer configured to store the image data.

4. The apparatus of claim 3, wherein the memory buffer is communicatively coupled to the processor, and wherein the processor is communicatively coupled to the rate limiter and the multiplexing device.

5. The apparatus of claim 3, wherein the memory buffer is configured to generate the input, wherein the input indicates that the image data has been written to the memory buffer.

6. The apparatus of claim 3, wherein the processor is configured to read out the image data from the memory buffer.

7. The apparatus of claim 3, wherein the processor is configured to send a flushing request to the memory buffer for instructing the memory buffer to transmit the image data to the processor.

8. The apparatus of claim 1, wherein the multiplexing device is configured to output the selected image data in response to receiving the input from a memory buffer or the processor.

9. The apparatus of claim 1, wherein the multiplexing device is configured to output the selected image data on a bus.

10. The apparatus of claim 1, further comprising:
    an image capture device configured to generate the image data; and
    a memory buffer configured to receive the image data from the image capture device.

11. The apparatus of claim 1, wherein the first transmission rate is different than the second transmission rate.

12. The apparatus of claim 1, wherein the input is generated based on a determination that the image data has been written to a memory buffer or that the memory buffer is full, and wherein the flushing operation is initiated based on the determination.

13. The apparatus of claim 1, further comprising a vehicle, wherein the vehicle includes the processor.

14. A method comprising:
    initiating, by a processor, a flushing operation for outputting image data at a first transmission rate;
    receiving, at a multiplexing device, the image data from the processor at the first transmission rate;
    receiving, at the multiplexing device, the image data from a rate limiter at a second transmission rate; and
    selecting, at the multiplexing device and based on an input, at least one of the image data at the first transmission rate or the image data at the second transmission rate.

15. The method of claim 14, further comprising:
    writing the image data in a memory buffer; and
    generating the input after the image data has been written to the memory buffer.

16. The method of claim 14, further comprising:
    providing, by the processor, the image data at the first transmission rate; and
    providing, by the rate limiter, the image data at the second transmission rate.

17. The method of claim 14, further comprising sending, by the multiplexer device, the selected image data on a bus.

18. The method of claim 14, wherein the second transmission rate is different than the first transmission rate.

19. The method of claim 14, further comprising:
    receiving, at a memory buffer, the image data from an image sensor; and
    determining that the image data has been written to the memory buffer.

20. A non-transitory computer-readable medium storing instructions, the instructions being executable by one or more processors to perform functions comprising:
    initiating a flushing operation for outputting image data at a first transmission rate;
    receiving the image data from the processor at the first transmission rate;
    receiving the image data from a rate limiter at a second transmission rate; and
    selecting, based on an input, at least one of the image data at the first transmission rate or the image data at the second transmission rate.

* * * * *